United States Patent Office 3,790,687
Patented Feb. 5, 1974

3,790,687
METHODS OF COMBATTING FUNGI AND BACTERIA USING SUBSTITUTED-ALPHA-ISONITROSO-ACETOPHENONES
Daniel Bertin, Jacques Perronnet, and Andre Teche, Paris, France, assignors to Roussel-UCLAF, Paris, France
No Drawing. Continuation-in-part of abandoned application Ser. No. 112,401, Feb. 3, 1971. This application May 22, 1972, Ser. No. 255,598
Claims priority, application France, Feb. 24, 1970, 6,527; May 26, 1971, 19,048
Int. Cl. A01n 9/20, 9/24
U.S. Cl. 424—327                                    11 Claims

ABSTRACT OF THE DISCLOSURE

Biocidal compositions having as the active ingredient an acetophenone of the Formula I

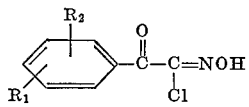

wherein $R_1$ represents hydrogen, chloro or hydroxy and $R_2$ represents hydrogen, hydroxy, nitro, methoxy, chloro or acetoxy, and a method of killing or combatting bacteria and fungi.

REFERENCE TO A PRIOR APPLICATION

This application is a continuation-in-part of our copending application SN. 112,401, filed Feb. 3, 1971 now abandoned.

OBJECTS OF THE INVENTION

It is an object of the invention to provide novel biocidal compositions.

It is another object of the invention to provide a novel method of killing bacteria and combatting fungi.

These and other objects and advantages of the invention will become obvious from the following detailed description.

THE INVENTION

The novel biocidal compositions of the invention are comprised of an effective amount of at least one compound of the Formula I

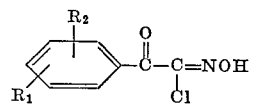

wherein $R_1$ represents hydrogen, chloro or hydroxy and $R_2$ represents hydrogen, hydroxy, nitro, methoxy, chloro or acetoxy with the proviso that at least one of $R_1$ and $R_2$ is other than hydrogen. Preferably, when $R_1$ represents a hydrogen, $R_2$ represents nitro or methoxy; when $R_1$ represents hydroxy, $R_2$ represents hydrogen, hydroxy, nitro, methoxy, chloro or acetoxy; when $R_1$ represents chloro, $R_2$ represents nitro, methoxy, chloro or acetoxy.

The compounds of Formula I preferentially include acetophenone compounds of the Formulae IA, IB and IC:

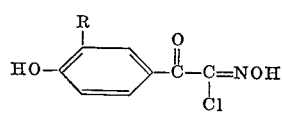

where R is hydrogen or hydroxyl;

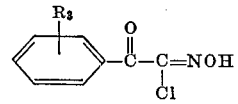

where $R_3$ is nitro or methoxy;

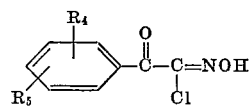

where $R_4$ is nitro, methoxy, chloro or acetoxy and $R_5$ is chloro or hydroxy.

Among the compounds of the Formula I, particularly the following novel compounds are of interest:

p-hydroxy-α-chloro-α-isonitroso-acetophenone,
3,4-dihydroxy-α-chloro-α-isonitroso-acetophenone,
3,ω-dichloro-ω-isonitroso-4-hydroxy-acetophenone,
ω-chloro-ω-isonitroso-4-nitro-acetophenone,
2.5,ω-trichloro-ω-isonitroso-acetophenone.

In naming these compounds, either the symbol α or ω can be utilized to designate the linear carbon atom attached to the ketone in the acetophenone structure.

The compositions of the invention include a biocidal carrier and can also contain other known industrial biocidal agents, if desired.

The acetophenone of Formula I may be prepared by reacting a compound having the Formula II

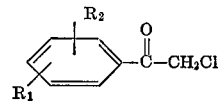

wherein $R_1$ and $R_2$ have the above assigned values, with an alkyl nitrite, preferably while passing hydrochloric acid gas through the reaction mixture. The reaction mechanism was adapted from a process described by Levin et al. [J. Org. Chem., 7, 408 (1942)]. Preferably the reaction is conducted in an inert organic solvent, such as ether and the alkyl nitrite is isopropyl nitrite.

The biocidal compounds and compositions of the invention have remarkable bactericidal and germicidal properties which make them useful as industrial biocides for combatting fungi and bacteria which develop in aqueous media used for the production of diverse industrial products. They are particularly useful for preventing and eliminating bacterial slime in paper-making circuits or in treatment of hides, vegetable tanning liquors, and leathers.

The compositions of the invention may be in the form of powders, granules, suspensions, emulsions or solutions and can contain, in addition to the active principles, cationic, anionic or nonionic surface active agents, inert powders such as talc, clays, silicates, kieselguhr, etc., vehicle such as water, alcohols, hydrocarbons or other organic solvents or animal, vegetable or mineral oils. The compositions preferably contain 10 to 100% by weight of the active acetophenone compound.

The solid compositions, presented in the form of a powder for dusting, of wettable powders or granules, can be prepared by grinding the active compound with an inert solid or by impregnation of a solid support with a solution of the active compound in a solvent which is next evaporated.

A typical biocidal composition of the invention consists of a wettable powder containing 25% by weight of an acetophenone of Formula I, 15% by weight of Ekapersol S (a condensation product of sodium naphthalene sulfonate), 0.5% by weight of Brecolane N. V. A. (sodium alkylnaphthalene sulfonate), 34.5% by weight of Zeosil 39 (a precipitated synthetic hydrated silica) and 25% by weight of Vercoryl S (colloidal Kaolin).

The novel method of the invention for combatting bacteria and fungi comprises contacting bacteria and fungi with a lethal amount of at least one of the acetophenones of Formula I. The method is particularly useful for preventing the pollution of industrial waters such as aqueous waters in paper-making which may also contain sizing resins. In particular the novel biocidal method comprises contacting bacteria and fungi with a biocidal amount of an acetophenone compound of Formula I and preferably preventing bacterial slime in aqueous media comprising incorporating a bactericidal amount of an acetophenone compound of Formula I to an aqueous media.

Tests effected in the presence of material such as paper pulp in aqueous suspension with resin sizing in conditions analogous to those used in practice demonstrates the biocidal properties of the acetophenone compounds of Formula I.

In the following examples there are described several preferred embodiments to illustrate the invention. However, it should be understood that the invention is not intended to be limited to the specific embodiments.

EXAMPLE I 25 g. of 4-hydroxy-α-chloro-acetophenone were added to 100 cc. of ether and hydrochloric acid gas was bubbled through the resulting suspension for 15 minutes. Then, while still bubbling the hydrochloric acid gas therethrough, a solution of 15.7 g. of isopropyl nitrite in 25 cc. of ethylether was added to the suspension over 1½ hours. The bubbling of the hydrochloric acid gas was maintained for 2 hours with agitation and then the mixture was allowed to stand for 15 hours at room temperature. The resulting solution was washed with water, then with an aqueous sodium bicarbonate solution until the wash waters have a pH of 4.5. The solution was dried, treated with charcoal, stirred and filtered. The filtrate wasconcentrated to dryness by distillation under reduced pressure and the residue was taken up in chloroform. The precipitate formed was recovered by vacuum filtration and was washed and dried to obtain 17 g. of p-hydroxy-α-chloro-α-isonitroso-acetophenone. A sample of the product was purified by crystallization from a mixture of ethyl ether and petroleum ether (boiling—65 to 75° C.) to obtain the product melting at 194° C.

Analysis.—$C_8H_6ClNO_3$; molecular weight=199.60.—Calculated (percent): C, 48.14; H, 3.03; Cl, 17.77; N, 7.02. Found (percent): C, 48.2; H, 2.9; Cl, 17.6; H, 7.0.

Thin-layer chromatography of the product showed two streaks which establishes the existence of two isomeric form (cis and trans) of the oxime.

EXAMPLE II

Using the procedure of Example I, 3,4-dihydroxy-α-chloro-acetophenone was reacted to form 3,4-dihyldroxy-α-chloro-α-isonitroso-acetophenone melting at 212° C.

Analysis.—$C_8H_6ClNO_4$; molecular weight=215.56.—Calculated (percent): C, 44.59; H, 2.80; Cl, 16.45; N, 6.50. Found (percent): C, 44.6; H, 2.7; Cl, 16.5; N, 6.3.

Thin-layer chromatography revealed the presence of two streaks establishing the presence of the cis and trans forms of the double bond of the oximes.

EXAMPLE III 35.4 g. of 3,ω - dichloro - 4-hydroxy-acetophenone (described in J. A. C. S. 59, 280, 1937) were introduced into 170 cc. of ether. A stream of anhydrous hydrochloric acid was passed through the mixture for a period of 15 minutes. Then, always under a stream of hydrochloric acid, a solution of 18.6 g. of isopropyl nitrite in 62 cc. of ether was introduced over a period of one hour. The stream of hydrochloric acid was allowed to bubble through the mixture for two hours and the mixture was further maintained for one hour at rest. The excess of the hydrochloric acid was eliminated under reduced pressure. The mixture was taken up in 300 cc. of ether. The ethereal phase was washed with water, dried over sodium sulfate and concentrated to dryness under reduced pressure at 50° C. By recrystallization from methylene chloride 29.3 g. of 3,ω-dichloro-ω-isonitroso-4-hydroxy-acetophenone were obtained melting at 202° C.

Analysis.—$C_8H_5Cl_2NO_3$=234.038.—Calculated (percent): C, 41.06; H, 2.15; Cl, 30.3; N, 5.98. Found (percent): C, 41.3; H, 2.3; Cl, 30.0; N, 6.

EXAMPLE IV 58.6 g. of 4-nitro-ω-chloroacetophenone [described in Pharm. Bull. (Japan) 1, 358–9 (1953)] were introduced into 300 cc. of ether. A stream of anhydrous hydrochloric acid was passed into the mixture for a period of 15 minutes. Then, over a period of 2 hours, 31 g. of isopropyl nitrite and 100 cc. of ether were introduced while continuing the stream of hyldrochloric acid. The reaction mixture was maintained for two hours at room temperature under current of hydrochloric acid. Then, 100 cc. of ether was added thereto. Thereafter the mixture was maintained at rest for a period of 17 hours at room temperature and then concentrated to dryness under reduced pressure at 40° C. By crystallization from methylene chloride 28 g. of ω-chloro-ω-isonitroso-4-nitro-acetophenone was obtained melting at 151° C.

Analysis. — $C_8H_5ClN_2O$=228.597. — Calculated (percent): C, 42.03; H, 2.20; N, 12.25; Cl, 15.51. Found (percent): C, 41.9; H, 2.0; N, 12.2; Cl, 16.4.

EXAMPLE V 33 g. of 2,5ω-trichloro-acetophenone were introduced into 100 cc. of ether. A stream of anhydrous hydrochloric acid was passed through the mixture for a period of 15 minutes. Then a solution of 15.7 g. of isopropyl nitrite in 25 cc. of ether was introduced over a period of one hour, always under a stream of hydrochloric acid. Thereafter the hydrochloric acid was bubbled through the mixture for a period of two hours at room temperature and then the mixture was allowed to stand at rest overnight. The solution obtained was washed with water, dried over sodium sulfate, filtered and distilled to dryness under reduced pressure. The residue was purified by recrystallization from petroleum ether. 13.5 g. of 2,5-ω-trichloro-ω-isonitroso-acetophenone were obtained in the form of white crystals melting at 125° C., soluble in chloroform, ethanol and ether and slightly soluble in water.

Analysis. — $C_8H_4Cl_3NO_2$=252.49. — Calculated: Percent C, 38.06; percent H, 1.60; percent Cl, 42.13; percent N, 5.55. Found: Percent C, 38.3; percent H, 1.7; percent Cl, 42.4; percent 5.7.

The 2,5,ω-trichloro-acetophenone utilized as the starting material was prepared in the following manner. A stream of chlorine was bubbled through 240 g. of 2,5-dichloro-acetophenone while heated to 130° C. The liquid formed was rectified under reduced pressure and 326 g. of a mixture of 2,5,ω,ω-tetrachloro-acetophenone, 2,5, ω,ω,ω-pentachloroacetophenone and 2,5,ω-trichloroacetophenone was obtained. On chromatography of 143 g. of the mixture through silica gel with elution with a mixture (7:3) of hexane and benzene, 26 g. of 2,5,ω-trichloroacetophenone were isolated in the form of white crystals melting at 50° C. and soluble in chloroform and benzene.

ANTIMICROBIC ACTIVITY

The inhibition of bacteria tested cultivated on a paper pulp medium enriched in bacteria showed the biocidal efficacy of 4-hydroxy-α-chloro-α-isonitroso-acetophenone (Compound A). The test used 12.5 g./liter of paper pulp in an aqueous suspension with resin sizing and the contamination was effected with a bacterial (Aerobacter areogenes) suspension. The test compound was added at concentrations of 50 and 25 p.p.m. and two tests were run for each concentration. The number of germs in each test was determined before and one, four and seven hours after the addition of the test compound. The readings of these numbers was made after 48 hours of storage at 35° C. The results are expressed in percentage of diminution of the number of germs as compared to the non tested controls. Parallel tests were conducted with ethyl-γ-bromo-acetylacetate (Prior 101) and the results are shown in Table I.

TABLE I

| Dose in p.p.m. | Time in hours | Compound A | Piror 101 |
|---|---|---|---|
| 50 | 1 | 100 | 77.6 |
|  | 4 | 100 | 100 |
|  | 7 | 100 | 100 |
| 25 | 1 | 99.4 | 0 |
|  | 4 | 99.5 | 84 |
|  | 7 | 97.9 | 92.6 |

The results show that 4-hydroxy-α-chloro-α-isonitroso-acetophenone has an elevated biocidal activity.

The tests were repeated utilizing 3,ω-dichloro-ω-isonitroso-4-hydroxy-acetophenone (Compound B) and ω-chloro-ω-isonitroso-4-nitro-acetophenone (Compound C) and reported in Tables II and III.

TABLE II

| Dose in p.p.m. | Time in hours | Compound B | Piror 101 |
|---|---|---|---|
| 50 | 1 | 97.5 | 15.7 |
|  | 4 | 99.2 | 99.2 |
|  | 7 | 99.7 | 100. |
| 25 | 1 | 89.2 | 11.9 |
|  | 4 | 92.0 | 79.5 |
|  | 7 | 95.1 | 96.5 |

TABLE III

| Dose in p.p.m. | Time in hours | Compound B | Piror 101 |
|---|---|---|---|
| 50 | 1 | 94.3 | 7.4 |
|  | 4 | 100 | 86.3 |
|  | 7 | 100 | 100 |
| 25 | 1 | 70.8 | 5.0 |
|  | 4 | 95.3 | 86.5 |
|  | 7 | 97.7 | 98.3 |

These results show that the substituted ω-chloro-ω-isonitroso-acetophenones of the invention have an elevated biocidal activity.

Various modifications of the compositions and method of the invention may be made without departing from the spirit or scope thereof and it should be understood that the invention is to be limited only as defined in the appended claims.

We claim:

1. A method of combatting bacteria or fungi which comprises applying to said bacteria or fungi a bactericidally or fungicidally effective amount of a compound of the formula

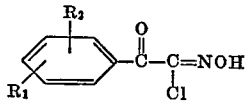

wherein $R_1$ represents a member selected from the group consisting of hydrogen, chloro and hydroxy and $R_2$ represents a member selected from the group consisting of hydrogen, hydoxy, nitro, methoxy, chloro, and acetoxy, with the proviso that at least one of $R_1$ and $R_2$ is other than hydrogen.

2. The method of claim 1 wherein said compound has the formula

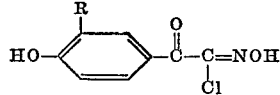

wherein R represents a member selected from the group consisting of hydrogen and hydroxy.

3. The method of claim 2 wherein R is hydrogen.
4. The method of claim 2 wherein R is hydroxy.
5. The method of claim 1 wherein said compound has the formula

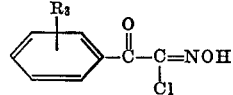

wherein $R_3$ represents a member selected from the group consisting of nitro and methoxy.

6. The method of claim 5 wherein $R_3$ is 4-nitro.
7. The method of claim 1 wherein said compound has the formula

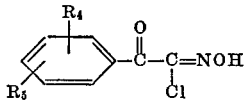

wherein $R_4$ represents a member selected from the group consisting of nitro, methoxy, chloro and acetoxy and $R_5$ represents a member selected from the group consisting of chloro and hydroxy.

8. The method of claim 7 wherein $R_4$ is 5-chloro and $R_5$ is 2-chloro.
9. The method of claim 7 wherein $R_4$ is 3-chloro and $R_5$ is 4-hydroxy.
10. The method of claim 1 wherein the bacteria are in an industrial water system.
11. The method of claim 10 wherein the industrial water system is a paper pulp in aqueous suspension.

References Cited

UNITED STATES PATENTS 2,320,234  5/1943  Hartung et al. ____ 260—566 A
3,090,812  5/1963  Wilbert et al. _____ 260—566 A

OTHER REFERENCES

Levin et al., J. Org. Chem., vol. 7 (1942) pp. 408–415.
Yakobson et al., Chem. Abst. vol. 58 (1963) p. 11243.
Sacha et al., Chem. Abst. vol. 52 (1958) p. 9127.

JEROME D. GOLDBERG, Primary Examiner

A. J. ROBINSON, Assistant Examiner

U.S. Cl. X.R.

424—311; 210—62, 64; 162—161

UNITED STATES PATENT OFFICE
CERTIFICATE OF CORRECTION

Patent No. 3,790,687          Dated  Feb. 5, 1974

Inventor(s) DANIEL BERTIN, JACQUES PERRONNET and ANDRE TECHE

It is certified that error appears in the above-identified patent and that said Letters Patent are hereby corrected as shown below:

| Patent | | Appln. | | |
|---|---|---|---|---|
| Col. | Line | Page | Line | |
| 1 | 28 | 1 | 8 | After "acetoxy", insert --with the proviso that at least one of $R_1$ and $R_2$ is other than hydrogen-- |

Signed and sealed this 17th day of June 1975.

(SEAL)
Attest:

RUTH C. MASON
Attesting Officer

C. MARSHALL DANN
Commissioner of Patents
and Trademarks